(12) United States Patent
Kolls

(10) Patent No.: US 11,037,160 B1
(45) Date of Patent: Jun. 15, 2021

(54) SYSTEMS AND METHODS FOR PREEMPTIVE FRAUD ALERTS

(71) Applicant: Wells Fargo Bank, N.A., San Francisco, CA (US)

(72) Inventor: H. Brock Kolls, Alpharetta, GA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 357 days.

(21) Appl. No.: 15/643,071

(22) Filed: Jul. 6, 2017

(51) Int. Cl.
*G06Q 20/40* (2012.01)
*G06Q 20/10* (2012.01)

(52) U.S. Cl.
CPC ......... *G06Q 20/4016* (2013.01); *G06Q 20/10* (2013.01)

(58) Field of Classification Search
CPC ............................ G06Q 20/401; G06Q 20/10
See application file for complete search history.

(56) References Cited

U.S. PATENT DOCUMENTS

| | | | |
|---|---|---|---|
| 7,580,891 B2 | 8/2009 | Klebanoff | |
| 7,945,515 B2 | 5/2011 | Zoldi et al. | |
| 8,635,117 B1 | 1/2014 | Acuna-Rohter | |
| 8,855,681 B1* | 10/2014 | George | H04W 4/02 455/456.3 |
| 8,862,526 B2* | 10/2014 | Miltonberger | G06Q 10/067 706/15 |
| 8,918,904 B2 | 12/2014 | Sanin et al. | |
| 9,418,365 B2 | 8/2016 | Groarke et al. | |
| 9,483,606 B1 | 11/2016 | Dean et al. | |
| 2005/0209961 A1* | 9/2005 | Michelsen | G06Q 40/02 705/39 |
| 2006/0064374 A1* | 3/2006 | Helsper | G06Q 20/10 705/39 |
| 2010/0169192 A1* | 7/2010 | Zoldi | G06Q 40/00 705/30 |
| 2010/0325035 A1* | 12/2010 | Hilgers | G06Q 40/025 705/38 |
| 2011/0131122 A1* | 6/2011 | Griffin | G06Q 40/08 705/35 |
| 2012/0011041 A1 | 1/2012 | Beydler et al. | |
| 2012/0036071 A1* | 2/2012 | Fulton | G06Q 20/10 705/44 |
| 2012/0101930 A1* | 4/2012 | Li | G06Q 40/02 705/35 |

(Continued)

*Primary Examiner* — Ryan D Donlon
*Assistant Examiner* — Mark A Malkowski
(74) *Attorney, Agent, or Firm* — Foley & Lardner LLP

(57) ABSTRACT

A computer-implemented method includes identifying an individual having a prior interaction with a target customer, generating a risk score for the identified individual based on information regarding the regarding the individual, the information regarding the individual either being stored in a database associated with a financial institution computing system or at an external computing system, determining that the risk score is above a predetermined threshold, receiving an indication of a potential interaction between the target customer and the identified individual, and transmitting an alert to a customer computing device associated with the target alert in response to receiving the indication and the risk score being above the predetermined threshold, the alert notifying the target customer that the identified individual is likely to defraud the target customer.

18 Claims, 5 Drawing Sheets

(56) References Cited

U.S. PATENT DOCUMENTS

| | | | |
|---|---|---|---|
| 2012/0191596 A1* | 7/2012 | Kremen | G06Q 40/02 705/38 |
| 2012/0226579 A1 | 9/2012 | Ha et al. | |
| 2012/0239557 A1* | 9/2012 | Weinflash | G06Q 40/02 705/39 |
| 2012/0317027 A1* | 12/2012 | Luk | G06Q 40/02 705/44 |
| 2012/0323783 A1* | 12/2012 | Canetto | G06Q 20/405 705/44 |
| 2013/0024300 A1* | 1/2013 | Choudhuri | G06Q 30/018 705/16 |
| 2013/0054447 A1* | 2/2013 | Ross | G06Q 50/01 705/38 |
| 2013/0054480 A1* | 2/2013 | Ross | G06Q 30/0201 705/319 |
| 2013/0060361 A1* | 3/2013 | Gabrail | A63F 13/812 700/91 |
| 2013/0218865 A1* | 8/2013 | Angulo | H04L 67/22 707/709 |
| 2014/0067656 A1* | 3/2014 | Cohen Ganor | G06Q 20/384 705/39 |
| 2015/0052061 A1 | 2/2015 | Anderson et al. | |
| 2015/0262177 A1* | 9/2015 | Mohammed | G06Q 20/401 705/44 |
| 2015/0348042 A1* | 12/2015 | Jivraj | G06Q 20/322 705/44 |
| 2016/0034898 A1 | 2/2016 | Ghosh | |
| 2016/0104133 A1* | 4/2016 | Davis | G06Q 20/10 705/39 |
| 2016/0112451 A1* | 4/2016 | Jevans | H04L 63/1433 726/25 |
| 2016/0134720 A1 | 5/2016 | Pochic et al. | |
| 2016/0140561 A1 | 5/2016 | Cowan | |
| 2016/0314471 A1 | 10/2016 | Gerber et al. | |
| 2016/0328814 A1* | 11/2016 | Prichard | G06Q 30/0204 |
| 2016/0335614 A1 | 11/2016 | Norota | |
| 2016/0335641 A1 | 11/2016 | White et al. | |
| 2016/0364409 A1* | 12/2016 | Memon | H04W 4/021 |
| 2017/0011404 A1* | 1/2017 | Glower | G06Q 20/4016 |
| 2017/0078322 A1* | 3/2017 | Seiver | H04L 43/0876 |
| 2017/0140382 A1* | 5/2017 | Chari | G06Q 20/389 |
| 2017/0148025 A1* | 5/2017 | Le | G06Q 20/4016 |
| 2017/0221149 A1* | 8/2017 | Hsu-Hoffman | G06Q 40/08 |
| 2017/0249698 A1* | 8/2017 | Chan | G06Q 40/025 |
| 2017/0270493 A1* | 9/2017 | Lugli | G06Q 20/027 |
| 2017/0300911 A1* | 10/2017 | Alnajem | G06Q 20/4014 |
| 2017/0325275 A1* | 11/2017 | Tonsgard | H04W 4/023 |

* cited by examiner

SYSTEMS AND METHODS FOR PREEMPTIVE FRAUD ALERTS

BACKGROUND

Individuals typically trust other people that they have close relationships with. Additionally, individuals are more likely to engage in transactions favorable for people that they know and trust. Such tendencies unfortunately provide opportunities for fraudsters to engage in illegitimate transactions with people or entities that know and trust the fraudster or have a close relationship with the fraudster. Particularly in a time of financial or legal stress, a fraudster may leverage the trust of another individual or entity to extract funds from them. Accordingly, it would be beneficial to provide a system for alerting individuals of the potential of illegitimate transactions perpetrated by someone they know and trust or have a close relationship with prior to an occurrence or completion of such a transaction.

SUMMARY

One embodiment relates to a financial institution computing system associated with a financial institution. The financial institution computing system includes a network interface configured to exchange data over a network. The financial institution computing system also includes an accounts database storing information pertaining to various accounts of a plurality of customers of the financial institution including an account of a target customer. The financial institution computing system also includes a risk assessment circuit configured to identify an individual having a prior interaction with the target customer. The risk assessment circuit is also configured to generate a risk score for the individual based on information regarding the individual, the information regarding the individual stored in at least one of the accounts database or an external computing system. The risk assessment circuit is also configured to determine that the risk score exceeds a predetermined threshold. The risk assessment circuit is also configured to receive an indication of a potential interaction between the target customer and the identified individual. The risk assessment circuit is also configured to transmit, by the network interface, an alert to a customer computing device associated with the target customer in response to receiving the indication and the risk score exceeding the predetermined threshold, the alert notifying the target customer that the individual has a high likelihood of defrauding the target customer.

Another embodiment relates to a computer-implemented method. The method includes identifying, by a financial institution computing system associated with a financial institution, an individual having a prior interaction with a target customer. The method also includes generating, by the financial institution computing system, a risk score for the individual based on information regarding the individual. The method also includes determining, by the financial institution computing system, that the risk score exceeds a predetermined threshold. The method also includes receiving, by the financial institution computing system, an indication of a potential interaction between the target customer and the identified individual. The method also includes transmitting, by the financial institution computing system, an alert to a customer computing device associated with the target customer in response to receiving the indication and the risk score exceeding the predetermined threshold, the alert notifying the target customer that the identified individual has a high likelihood of defrauding the customer.

Another embodiment relates to a non-transitory computer readable media having computer-executable instructions embodied therein that, when executed by a risk assessment circuit of a computing system, causes the computing system to perform operations. The operations include identifying an individual having a prior interaction with a target customer. The operations also include generating a risk score for the identified individual based on information regarding the individual, the information regarding the individual either being stored in a database associated with the financial institution computing system or at an external computing system. The operations also include determining that the risk score is exceeds predetermined threshold. The operations also include receiving an indication of a potential interaction between the target customer and the identified individual. The operations also include transmitting an alert to a customer computing device associated with the target customer in response to receiving the indication and the risk score exceeding the predetermined threshold, the alert notifying the target customer that the identified individual is likely to defraud or steal from the target customer.

DETAILED DESCRIPTION

Figure 1:
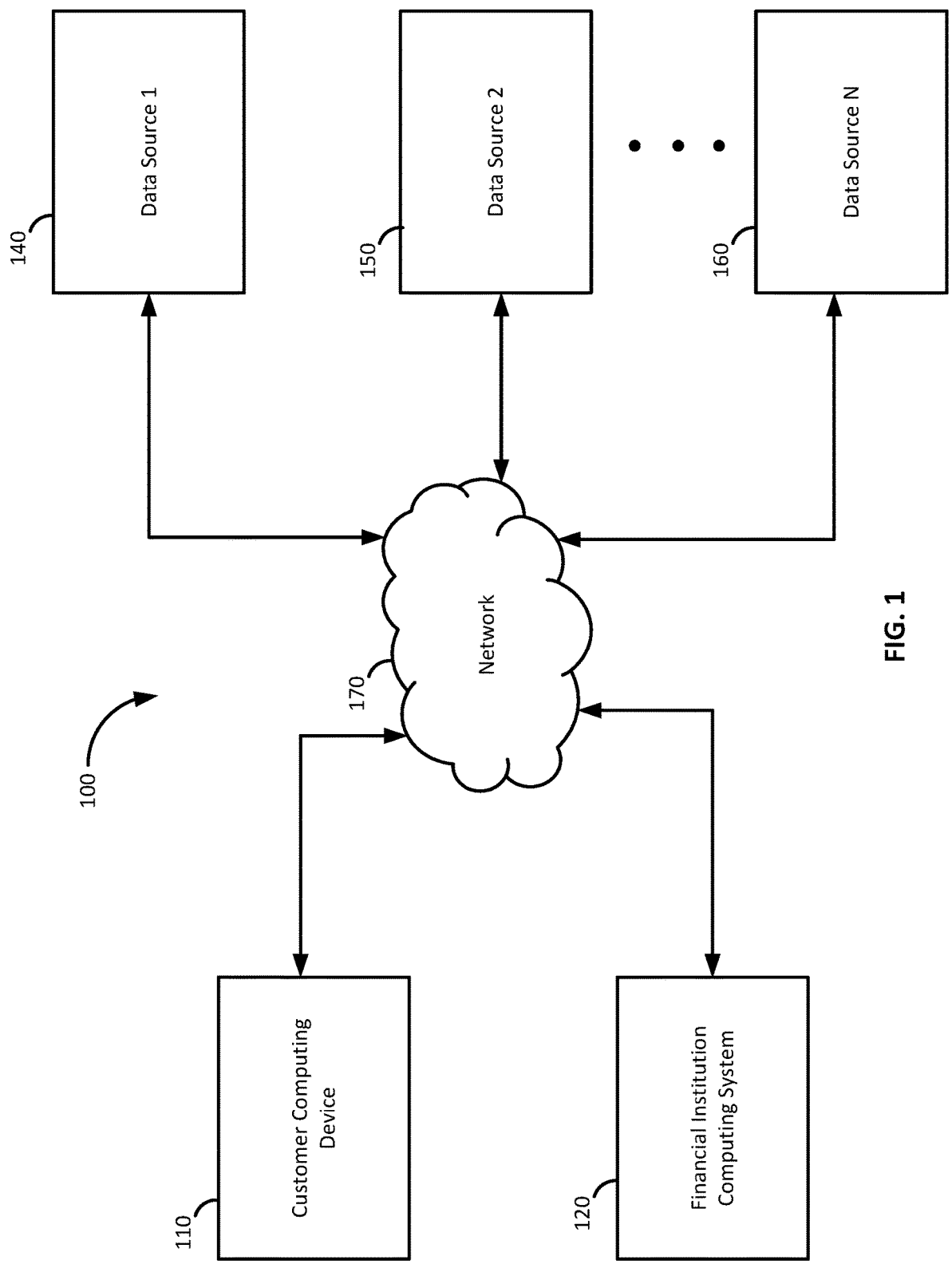
FIG. 1 is a block diagram of a security enhancement system, according to an example embodiment.

Before turning to the figures, which illustrate example embodiments, it should be understood that this application is not limited to the details or methodology set forth in the following description or illustrated in the figures. It should also be understood that the phraseology and terminology employed herein is for the purpose of description only and should not be regarded as limiting. For example, the embodiments of systems and methods discussed herein may be relevant to any of a variety of circumstances where providing an alert to a customer may be useful.

Referring generally to the figures, systems and methods for providing preventative alerts to a customer are shown according to example embodiments. A financial institution computing system associated with a financial institution accesses various data sources (e.g., social media platforms, public databases) to identify a set of individuals having some form of a relationship (e.g., family members, friends, coworkers, social media connections) with the customer (hereafter referred to as "customer associations"). The financial institution computing system accesses additional data sources (e.g., an accounts database at the financial institution computing system, criminal records databases) to generate a pre-fraud risk score for each of the customer associations. In various embodiments, the pre-fraud risk score includes a financial component and a character component. The financial component may be determined based on an analysis of an individual's account at the financial institution. Financially healthy individuals may receive a lower financial risk score than those that are less financially healthy. The character component may be determined by identifying a set of actions (e.g., actions identified in content posted on social media) performed by a customer association, and categorizing each of the actions (e.g., according to a predetermined action classification system). If the pre-fraud risk score for a particular customer association is above a threshold, then the customer association is identified as high risk. In response to receiving an indication of a potential customer interaction with a high risk customer association, the financial institution computing system transmits an alert to a computing device associated with the customer. This way, the customer is alerted to the customer association's high risk status prior to engaging in a transaction with the customer association.

The embodiments and implementations of the systems and methods disclosed herein improve current fraud prevention systems by pre-emptively warning the customer of the potential for fraud prior to the customer engaging in or completing any sort of transaction. This is accomplished by accessing various data sources (e.g., social media platforms, public databases) to identify a set of individuals that the customer regularly interacts with, and by assembling data regarding each of the identified individuals from a number of data sources. Additionally, by receiving data indicative of potential interactions of the customer with any of the individuals and alerting the customer prior to completion of any transactions between the customer and the individuals, the customer is more aware of the risks of engaging in such transactions.

Referring to FIG. 1, a block-diagram illustrating a security enhancement system 100 is shown according to an example embodiment. The security enhancement system 100 includes a customer computing device 110 associated with a customer, a financial institution computing system 120 associated with a financial institution, and various data sources 140-160, as illustrated by the first data source 140, the second data source 150, and the $n^{th}$ data source 160. Various components of the security enhancement system 100 communicate with one another over a network 170. The network 170 is a data exchange medium, which may include wireless networks (e.g., cellular networks, Bluetooth®, WiFi, Zigbee®), wired networks (e.g., Ethernet, DSL, cable, fiber-based), or a combination thereof. In some embodiments, the network 170 includes the internet.

The customer computing device 110 is a computing system associated with a customer of the financial institution. For example, the customer may utilize the customer computing device to communicate information with various other individuals via a social media platform, engage in transactions using an account held by the customer at the financial institution (e.g., via a mobile wallet application on the customer computing device, a person-to-person payments application, or by an e-commerce marketplace). As such, the customer computing device 110 includes one or more processors and non-transitory storage mediums housing one or more logics configured to enable the customer computing device 110 to exchange data over the network 170, execute software applications, access websites, generate graphical user interfaces, and perform other similar functionalities. Examples of the customer computing device 110 include a personal computer such as a desktop or laptop computer, smartphones, tablets, wearable computing devices such as smartwatches, and the like.

The customer computing device 110 is configured to communicate with the financial institution computing system 120 via the network 170 to exchange information. In some embodiments, the customer computing device 110 is configured to receive alerts from the financial institution computing system 120 when the financial institution computing system 120 detects that the customer may potentially engage in a transaction with a high risk customer association identified as such via the systems and methods disclosed herein.

The financial institution computing system 120 is a computing system associated with the financial institution. The financial institution may include commercial or private banks, credit unions, investment brokerages, or the like. In various embodiments, the financial institution computing system 120 may perform various operations to deliver pre-emptive fraud alerts to the customer computing device 110. For example, the financial institution computing system 120 may access data sources 140-160 to identify various customer associations (e.g., friends, family, co-workers, and other social media connections). Having identified the customer associations, the financial institution computing system 120 may access additional data sources 140-160 to ascertain a level of risk associated with each of the identified customer associations. For example, in some embodiments, the financial institution computing system 120 accesses public criminal records databases to determine if any of the customer associations have engaged in criminal activity, and retrieves information regarding the identified customer associations from a database maintained at the financial institution computing system 120 to determine the financial status of the identified customer associations. Having gathered such information, the financial institution computing system 120 predicts a risk level associated with each of the identified customer associations.

In various embodiments, if a risk level associated with any of the identified customer associations reaches a predetermined threshold (referred to herein as "high risk customer associations"), the financial institution computing system 120 is further configured to monitor information regarding the customer (e.g., social media information, location information, customer transaction information) to identify times when the customer may potentially engage in a transaction with a high risk customer association. For example, the financial institution computing system 120 may monitor activity in the customer's financial account to determine if the customer is attempting to transfer funds from the customer's financial account to a financial account associated with a high risk customer association. For example, if the identified high risk customer association has an account at the financial institution, the financial institution computing system 120 may flag the high risk customer association's account such that, if the customer (e.g., via a check or a person-to-person payment application) attempts to transfer funds into the high risk customer association's account, the customer is delivered a pre-emptive fraud alert notifying the customer of the high risk status of the transaction prior to authorizing the transaction to take place. This way, the customer is aware of the risks associated with the transaction prior to the transaction's completion.

Data sources 140-160 are repositories of information pertaining to various users. In various arrangements, the data sources 140-160 include any source of information that may be accessed over the network 170. For example, the first data source 140 may include a social media database (e.g., Facebook®, Twitter®, Friendster®, Yelp®, Myspace®, LinkedIn®, and/or ShutterFly®) storing information pertaining to social media accounts of various users (e.g., user posts to social media, user profile information, and the like). The second data source 150 may include a credit bureau storing various user credit reports associated with various users. The data source 160 may include a government record depository. For example, the data source 160 may include a public criminal records database (e.g., associated with a municipality, county, state or federal government) storing information regarding crimes committed by various individuals. Data sources 140-160 may also include various other websites at which users have accounts or make information about themselves available such as blogs, forums, online shopping websites (e.g., in the form of reviews written by the customer), gift registries, and the like. In various arrangements, the data sources 140-160 are communicably coupled to the network 170 via an associated computing system.

Figure 2:
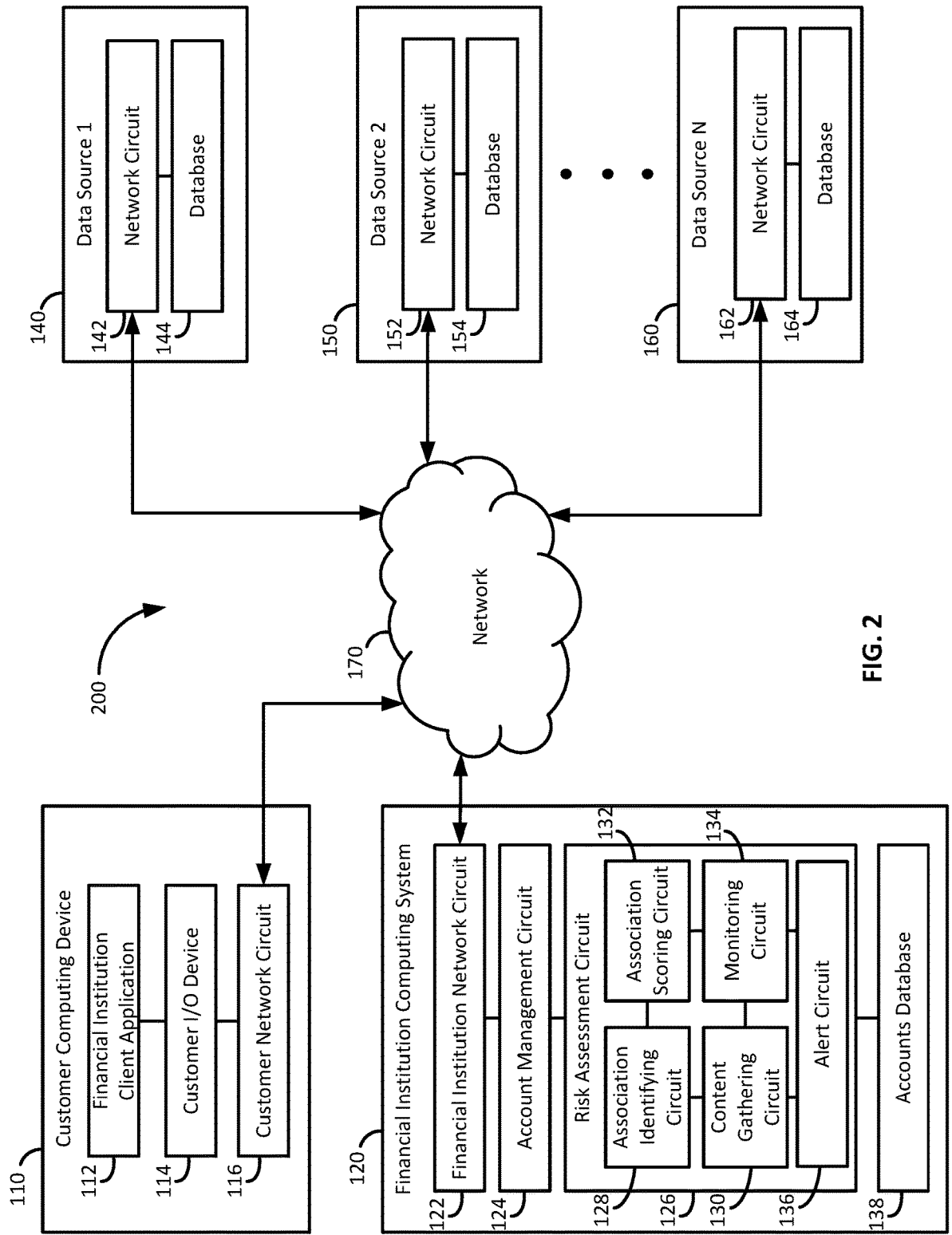
FIG. 2 is a block diagram illustrating an example embodiment of the security enhancement system of FIG. 1, according to an example embodiment.

Referring now to FIG. 2, a security enhancement system 200 is shown as a more detailed embodiment of the security enhancement system 100 discussed in relation to FIG. 1. The security enhancement system 200 includes example embodiments of the customer computing device 110, financial institution computing system 120, and data sources 140-160 of FIG. 1.

In the system 200, the customer computing device 110 includes a financial institution client application 112, a customer I/O device 114, and a customer network circuit 116 enabling the customer computing device 110 to exchange data over the network 170. The customer I/O device 114 includes hardware and associated logics configured to enable the customer computing device 110 to exchange information with the customer. An input aspect of the customer I/O device 114 allows the customer to provide information to the customer computing device 110, and may include, for example, a mechanical keyboard, a touchscreen, a microphone, a camera, a fingerprint scanner, any user input device engageable to the customer computing device 110 via a USB, serial cable, Ethernet cable, and so on. An output aspect of the customer I/O device 114 allows the customer to receive information from the customer computing device 110, and may include, for example, a digital display, a speaker, illuminating icons, LEDs, and so on. Further, the customer I/O device 114 may be configured to include assemblies that serve both input and output functions, allowing the financial institution computing system 120 to exchange information with the customer computing device 110. Such assemblies include, for example, radio frequency transceivers (e.g., RF or NFC-based transceivers) and other short range wireless transceivers (e.g., Bluetooth™, laser-based data transmitters).

The financial institution client application 112 is structured to cause the customer computing device 110 to provide a display that enables the customer to communicate with the financial institution computing system 120 over the network 170. Accordingly, the financial institution client application 112 is communicably coupled to the customer network circuit 116. The displays provided by customer computing device 110 via the financial institution client application 112 may enable the customer to manage accounts held by the customer at the financial institution associated with the financial institution computing system 120 (e.g., view balances, transfer funds, pay bills). Additionally, the displays presented to the customer via the financial institution client application 112 may enable the customer to indicate a preference to register for a pre-emptive fraud alert program provided by the financial institution. Under such a program, the financial institution computing system 120 transmits alerts to the customer computing device 110 when the financial institution computing system 120 detects that a customer association is at risk of engaging in a fraudulent transaction in accordance with the methods described herein. In various embodiments, such alerts are presented to the customer via the financial institution client application 112.

In some embodiments, the financial institution client application 112 is a separate software application implemented on the customer computing device 110. The financial institution client application 112 may be downloaded by the customer computing device 110 prior to its usage, hard coded into the memory of the customer computing device 110, or be a web-based interface application such that the customer computing device 110 may provide a web browser to the application, which may be executed remotely from the customer computing device 110 or downloaded by the customer computing device 110 just prior to its usage. In some embodiments, parts of the financial institution client application 112 may be stored in the memory of the customer computing device 110 and others may be web-based. In such instances, the customer may have to log onto or access the web-based interface before usage of the applications. Further, and in this regard, the financial institution client application 112 may be supported by a separate computing system including one or more servers, processors, network interface circuits that transmit applications for use to the customer computing device 110. In certain embodiments, the financial institution client application 112 includes an API and/or a software development kit (SDK) that facilitates the integration of other applications (e.g., a social media client application).

The financial institution computing system 120 includes a financial institution network circuit 120 enabling the financial institution computing system 120 to communicate data over the network 170, an account management circuit 124, a risk assessment circuit 126, and an accounts database 138. The accounts database 138 is structured to retrievably store information pertaining to accounts held by a number of customers at the financial institution. The accounts database 138 may include non-transient data storage mediums (e.g., local disc or flash-based hard drives, local network servers) or remote data storage facilities (e.g., cloud servers). The accounts database 138 may include personal customer information (e.g., names, addresses, phone numbers), identification information (e.g., driver's license numbers, standard biometric data), and customer financial information (e.g., token information, account numbers, account balances, available credit, credit history, transaction histories).

The account management circuit 124 is configured to manage the financial accounts of various customers, including maintaining and handling transaction processing for various customer accounts. In some embodiments, the financial institution client application 112 is provided by the account management circuit 124. In this regard, the account management circuit 124 is configured to provide interfaces, displays, and associated content to enable customers to create and manage accounts at the financial institution associated with the financial institution computing system 120.

The risk assessment circuit 126 is structured to manage a pre-emptive fraud alert program for the customer. In this regard, the risk management circuit 126 is configured to access data sources 140-160 to identify a set of customer associations, access additional data sources 140-160 to retrieve information regarding the set of customer associations, generate a risk level for each customer association (hereafter referred to as a "pre-fraud risk score"), identify any high risk customer associations based on the risk score, monitor information regarding the customer to determine if the customer is likely to interact with any of the high risk customer associations, and transmit a pre-emptive fraud alert to the customer computing device 110 in response to identifying an indication of a potential customer interaction with a high risk customer association. Accordingly, the risk assessment circuit is communicatively coupled to the financial institution network circuit 122, account management circuit 124, and accounts database 138.

As shown, the risk assessment circuit 126 includes an association identifying circuit 128, a content gathering circuit 130, an association scoring circuit 132, a monitoring circuit 134, and an alert circuit 136. In various arrangements, the activities of one circuit may be combined with the activities of another circuit. As shown, the various circuits 126-134 may be embodied within a system memory of a processing circuit of the financial institution computing system 120 (not shown). However, other embodiments of the risk assessment circuit 126 are envisioned. For example, each of the circuits 126-134 may be embodied as separate processing circuits that may or may not be geographically dispersed from one another. For example, any of the circuits 126-134 may be implemented at the customer computing device 110 (e.g., as a part of the financial institution client application 112). In some embodiments, some of the circuits 126-134 are located at the financial institution computing system 120 while others are installed on the customer computing device 110. Thus, the depiction and explanation contained herein is for exemplary purposes only.

The association identifying circuit 128 is configured to access data sources 140-160 to ascertain the identity of a set of customer associations. Information regarding customer associations may be found in the accounts database 138 (e.g., information stored in relation to an account of the customer may identify members of the customer's immediate family). Accordingly, upon the customer indicating a preference to register for the pre-emptive fraud alert program, the association identifying circuit 128 may query the accounts database 138 and retrieve identifying information (e.g., name) of any other individuals identified as being associated with the customer.

In various embodiments, the association identifying circuit 128 is configured to access data sources 140-160 to identify additional customer associations. For example, the association identifying circuit 128 may include an API configured to enable the financial institution computing system 120 to request information regarding a customer social media profile from a social media platform (or multiple social media platforms). As such, in some embodiments, the association identifying circuit 128 formulates an API request using the identity of the customer to request customer profile information. If the social media platform from which information is requested includes a profile for the customer, the corresponding data source of the data sources 140-160 returns information regarding the customer's profile to the financial institution computing system 120 via the network 170. Such profile information may identify various social media connections (e.g., "friends") of the customer. Additionally, the profile information may identify individuals that are closest to the customer (e.g., significant others, immediate family members, extended family members).

In some embodiments, rather than requesting information regarding the customer from social media platforms via various APIs, the association identifying circuit 128 is configured to directly access websites or the like operated by such platforms. In this regard, the association identifying circuit 128 may include a web scraping or harvesting module configured to pull content from the websites meeting predetermined parameters (e.g., containing the name of the customer). In some embodiments, having pulled content from the social media platform that includes the customer's name, the association identifying circuit 128 may take steps to verify that the pulled content actually pertains to the intended customer. In this regard, the association identifying circuit 128 may retrieve information pertaining to the customer from the accounts database 138, and determine if a particular social media page contains data matching the retrieved information from the accounts database 138. In this way, the association identifying circuit 128 verifies that a pulled social media page pertains to the customer. Having verified that a page pertains to the customer, the association identifying circuit 128 identifies other individuals that have interacted with the customer via the social media platform. For example, profile pages may include a listing of friends and family members of the customer.

In some embodiments, the association identifying circuit 128 is configured to rate individuals identified within the social media profile based on the frequency with which the customer interacts with the individual on the social media platform. For example, in some situations, information obtained from a social media platform may include information describing various customer communications (e.g., posts, reactions, photographs) on social media. Some of these communications may be directed at (or received from) the customer associations identified by the customer's profile page. Thus, the association identifying circuit 128 may be configured to rank the customer associations identified by the customer profile page based on the number and rate of the communications between the customer and the customer associations. In an example, a customer association that the customer has only communicated with once may receive a lower ranking than a customer association that the customer has communicated with dozens of times.

In some embodiments, the association identifying circuit 128 is also configured to access additional data sources 140-160 to identify additional customer associations. For example, the association identifying circuit 128 may access a family records database (e.g., a genealogy website) to identify additional individuals that are related to the customer. Additionally, the association identifying circuit 128 may search various search engines using information pertaining to the customer stored in the accounts database 138 to identify other individuals associated with the customer.

The content gathering circuit 130 is configured to gather information pertaining to the circumstances (hereafter referred to as "pre-fraud risk datum") of the set of customer associations identified by the association identifying circuit 128. In various embodiments, pre-fraud risk datum includes both a character inferring component and a financial status inferring component. The financial status inferring component generally relates to data that bears a relationship to the financial status of an individual. As such, data regarding financial accounts (e.g., transaction histories, account balance information, credit history information, information regarding individual mortgage payments) is included in the financial status component of the pre-fraud risk datum. In the event that a customer association is also a customer of the financial institution, such information may be stored in the accounts database 138. Accordingly, in some embodiments, the content gathering circuit 130 is configured to retrieve information regarding such customer associations from the accounts database 138.

In some embodiments, the content gathering circuit 130 is also configured to access data sources 140-160 for information regarding the financial status component of the pre-fraud risk datum. For example, the content gathering circuit 130 may access electronic foreclosure records databases to determine if any customer associations had property foreclosed on.

Regarding the character-inferring component, the content gathering circuit 130 is configured to access various data sources 140-160 for information regarding various actions taken by the customer associations. In this regard, the content gathering circuit 130 may access various social media platforms in a manner similar to the association identifying circuit 128 to retrieve information regarding social media posts and profiles of the customer associations. Additionally, the content gathering circuit 130 may automatically query search engines for information regarding the customer associations.

Additionally, the content gathering circuit 130 may further be configured to access additional data sources 140-160 to retrieve information regarding actions of the customer associations. For example, using the identities of the customer associations obtained from a social media platform, the content gathering circuit 130 may formulate information requests to various electronic criminal records databases associated with various governmental entities (e.g., municipal, county, state, federal). If any records are returned from any of the databases, the content gathering circuit 130 may take steps to verify that a returned record pertains to a customer association. In this regard, the content gathering circuit 130 compares information returned on a criminal record to information regarding a customer association obtained from another data source to verify the criminal record. For example, the location of the governmental entity from which the record was received may be compared to a location of the customer association contained in the social media profile of the customer association. If the locations match, the record may be considered to be verified.

In some embodiments, the content gathering circuit 130 is also configured to cause the association identifying circuit 128 to re-perform data gathering steps to identify various individuals having a relationship ship with each customer association such as social media friends and family (hereafter referred to as "connections of the customer association"). As a result, for each of the customer associations identified by the association identifying circuit 128, the content gathering circuit 130 may identify a list of connections (e.g., social media) of association, and a listing of various actions (e.g., described in social media posts, news articles, blogs, websites) performed by the customer association.

Still referring to FIG. 2, the association scoring circuit 132 is configured to assess the data regarding customer associations to generate a pre-fraud risk score for each of the connections of the customer. In various embodiments, the pre-fraud risk score for each connection includes a financial sub-score and a character sub-score. The pre-fraud risk score may include a weighted combination of the financial sub-score and the character sub-score. The association scoring circuit 132 may algorithmically determine a financial sub-score for a customer association based on information regarding the association retrieved from the accounts database 138. In various embodiments, the association scoring circuit 132 identifies various risk signatures within the retrieved financial data. Risk signatures are events or trends that are indicative that an individual is in financial stress. As an example, an individual missing a payment on a mortgage is a risk signature because individuals typically make payments on their homes even if finances are tight. Other risk signatures may include various other payments missed by the individual. In this regard, in some embodiments, the association scoring circuit 132 is configured to identify periodic payments (e.g., bills, rent) made by an individual by assessing trends in transaction data associated with the individual. The association scoring circuit 132 may identify recipients of periodic payments of individuals, and the timing and amount of such payments. For example, variations in timing and amount of payments to a common recipient in successive time periods (e.g., months) may be indicative of a late payment. To illustrate, the transaction history of a customer association may reveal that the customer association makes a periodic payment within a range of amounts for a utility bill on the fifteenth day of each month. If the association scoring circuit 132 identifies a utility bill payment made by the customer association on the twenty fifth day of the month for an amount exceeding the range of typical amounts paid, the payment may be identified as a late payment. Skipped payments may also be identified in a similar manner.

Other risk signatures indicated by the financial data may include various other characteristics. For example, certain account balance trends of an individual may be risk signatures. In this regard, the association scoring circuit 132 is configured to assess account balance trends of an individual and identify trends (e.g., a consistent overdrawing of an account, a continuous declining account balance) that may be indicative of an individual being in a state of financial stress. Additionally, the connection monitoring circuit 134 may also be configured to assess an individual's credit. For example, the association scoring circuit 132 may monitor an individual's debt level. Substantial increases in an individual's debt level may be indicative that an individual is in financial stress. In some embodiments, the association scoring circuit 132 also estimates the manner in which an individual is spending funds to estimate if any risk signatures are present. For example, in some embodiments, a sudden increase in an individual's withdrawal of funds from an account is a risk signature, as such actions are indicative of an individual's increase in the utilization of cash for payments.

Additionally, in some embodiments, the association scoring circuit 132 identifies transactions of an individual at predetermined merchants. Sudden increases in an individual's transactions at certain merchants (e.g., casinos, bars, restaurants) may be indicative of future financial stress for an individual. Other types of transactions may also serve as risk signatures. For example, if an individual refunds certain types of transactions (e.g., vacations, tuition, car payments), this may be an indication that the individual is in financial distress. Cancellation of relationships with certain service providers may also be indicators of financial distress. For example, if a customer association cancels a car insurance policy on a car but continues to make payments on a car (e.g., on a car loan, on a lease), this may be indicative of financial distress because the continuation of the car payments indicate the customer association is still able to drive, but cancellation of their insurance indicates that they cannot afford to properly insure the vehicle. Accordingly, the association scoring circuit 132 may search the transaction history of the customer associations to identify stoppages or other abnormalities in periodic payments to certain classes of merchants (e.g., insurance companies, financing companies, loan servicing companies).

Having identified various risk signatures with the financial data of an individual, the association scoring circuit 132 may generate a financial sub-score for the individual. In some embodiments, the connection scoring circuit includes a lookup table that provides an associated subcomponent risk score for various risk signatures that may be identified in the financial data of an individual. Accordingly, based on the identified risk signatures in a customer association's financial data, the association scoring circuit 132 aggregates each of the associated subcomponent risk scores to generate a financial sub-score for an individual. Such a process may be repeated for each of the customer associations identified by the association identifying circuit 128.

In some embodiments, the association scoring circuit 132 is configured to estimate various attributes of the customer associations based on the content retrieved by the content gathering circuit 130 and generate the character sub-score based on the estimated attributes. In some embodiments, certain customer attributes are estimated based on various actions taken by the customer associations, as determined from social media and other data gathered by the content gathering circuit 130. For example, based on social media data describing various events attended by an individual, the association scoring circuit 132 may infer a character attribute of an individual. If the individual regularly attends charity events, for example, a positive attribute (e.g., community involvement) may be inferred about the individual. Additionally, various other attributes may be estimated based on various other actions taken by the individual. For example, if searching the name of an individual in a criminal records database reveals that an individual has committed a crime, a negative user attribute may be attributed to the individual. Additional actions attributed to the individual in blog posts, other social media posts, and news articles may also be used to infer various other individual attributes. For example, if a social media post reveals that an individual has recently received a reward (e.g., a promotion or an educational degree), the association scoring circuit 132 may infer a positive individual attribute.

Having estimated attributes of a customer association based on the content gathered by the content gathering circuit 130, the association scoring circuit 132 may generate a base character sub-score for the customer association. In this regard, in some embodiments, the association scoring circuit 132 assigns various subcomponent risk scores to each attribute attributed to the customer association. Positive individual attributes may receive a positive subcomponent risk score and negative individual attributes may receive a negative subcomponent risk score. The subcomponent risk scores are then combined to generate a base character sub-score for a customer association. As such, if a particular customer association is determined to have a relatively large number of positive attributes to negative attributes, the customer association receives a positive base character sub-score. If, however, another customer association is determined to have a relative large number of negative attributes, the customer association receives a negative base character sub-score.

In some embodiments, after generating a base character sub-score score for an association, the association scoring circuit 132 computes an adjustment factor for the base character sub-score. In some embodiments, the adjustment factor is based on data regarding connections of the customer association. In this regard, for each customer association, the association identifying circuit 128 may access data sources 140-160 to such connections of the customer association. For example, the association identifying circuit 128 may access a social media profile page of a customer association to identify connections of the customer association. Having identified the connections, limited background checks are performed for each of the identified connections of the customer association. For example, the content gathering circuit 130 may access data sources 140-160 to determine if any connections of the customer association committed any crimes (e.g., by requesting information from police records databases and court records using the identity of the customer associations), and access social media platforms to retrieve information regarding actions taken by the connections.

After information is gathered regarding each of the connections of the customer association, the association scoring circuit 132 re-performs the pre-fraud risk procedures discussed above for each of the identified connections. As such, a base character sub-score is not only generated for each customer association, but also for various connections of each customer association. In various embodiments, the association scoring circuit 132 then performs various operations on the generated base character sub-scores to generate an adjustment factor for the base character sub-score of the customer association. In an example, if a summation of the base character sub-scores for each of the connections of the customer associations is positive (indicating that the connections of the customer association generally have positive attributes), then an adjustment factor is added to the customer association's base character sub-score that reflects positively on the association. In another example, if a summation of the base character sub-scores for each of the connections of the customer associations is negative (indicating that the connections of the customer association generally have negative attributes), then a negative adjustment factor is added to the association's base character sub-score that reflects negatively on the customer association.

In various embodiments, the extent of the adjustment factor depends on various factors. For example, each base character sub-score for the connections of the customer association may receive a weight based on an estimated closeness of the relationship between the customer association and a connection (e.g., based on amount and frequency of social media contacts) of the customer association. As such, the extent of the adjustment factor is more dependent on the base character sub-scores of the connections bearing the closest relationship to the customer association. Additionally, a multiplier may be applied to the summation of the base character sub-scores of the connections of the customer association prior to generating the final adjustment factor. The multiplier may be determined based on the number of identified connections of the customer association. The multiplier may also be based on the occurrence of certain actions (e.g., crimes such as fraud) within the connections of the customer association. If the connections of the customer association are determined to have taken such actions, then an enhanced multiplier may be applied to the weighted summation of the base sub-scores. As such, customer associations identified to have connections that have taken such actions may receive negative character sub-scores of greater magnitude.

Having generated a character sub-score and a financial sub-score for each customer association, the association scoring circuit 132 combines these scores to produce a pre-fraud risk score for each customer association. The association scoring circuit 132 is configured to combine the character sub-score and financial sub-score using weights predetermined by the financial institution. In various embodiments, if both the character sub-score and the financial sub-score for an individual is negative, then the magnitudes of the sub-scores are multiplied by positive weights and summed to produce an overall positive pre-fraud risk score. However, if either of the character sub-score or the financial sub-score for an individual is positive, such a sub-score is assigned a negative weight and added to the other sub-score. As such, if one of the sub-scores is negative (indicating that the customer association is a fraud risk), and the other is positive (indicating that the customer association is not a fraud risk), the two sub-scores tend to offset one another.

Having generated the pre-fraud risk scores for each customer association, the association scoring circuit 132 is further configured to identify high risk customer associations by comparing the generated pre-fraud risk scores with a positive threshold. In various embodiments, the threshold to which the pre-fraud risk scores are compared is dependent upon the customer. Customers having more indications of financial health (e.g., lower debt, higher credit scores, greater incomes, greater account balances), for example, may be assigned a higher threshold than individuals having fewer indications of financial health. In various embodiments, each of the customer associations having a pre-fraud risk score that is above the predetermined threshold is determined to be a high risk individual.

Still referring to FIG. 2, the monitoring circuit 134 is configured to monitor various datasets for any potential customer interactions with a high risk customer association identified by the connection scoring circuit. In this regard, in some embodiments, the monitoring circuit 134 is configured to generate a set of customer alert triggers. Such alert triggers may be datasets (e.g., location coordinates, identities of high risk individuals, account numbers) bearing a relationship with the high risk customer associations identified by the association scoring circuit 132. For example, if the risk assessment circuit 126 (e.g., via the content gathering circuit 130) is aware of a home address or other location (e.g., workplace) generally visited by a high risk customer association (e.g., based on information obtained from a social media webpage associated with the high risk individual), the monitoring circuit 134 may set location coordinates associated with the address as an alert trigger for the customer. This way, if the customer is visiting a high risk customer association to engage in a transaction with the high risk customer association, the customer will be pre-emptively notified of the individual's high risk status.

In some embodiments, location information associated with a high risk customer association may be set as an alert trigger for the customer. For example, assuming the financial institution has access to location information generated by a computing device of a high risk customer association (e.g., if the high risk customer association is a customer of the financial institution and has installed an application, similar to the financial institution client application 112 on the computing device), the monitoring circuit 134 may be configured to periodically monitor the location information of both the customer and the high risk customer association and, if the locations are within a threshold of one another, send an alert to the customer.

In some embodiments, the monitoring circuit 134 sets an account associated with the high risk customer association as a customer alert trigger. For example, an account number associated with the high risk customer association's account may be established as an alert trigger for the customer. This way, if the customer attempts to transfer funds to a high risk customer association (e.g., via a check or person-to-person payment application), the customer will be alerted. Additionally, the monitoring circuit 134 may set various other datasets as alert triggers for the customer. For example, the appearance of a high risk customer association's name in a description of an event to be attended by the customer may be established as an alert trigger. This way, if the monitoring circuit 134 detects such an event in the customer's social media data, an alert will be transmitted to the customer. Various other attributes of a high risk customer association (e.g., phone number, e-mail address) may also be established as customer alert triggers.

As such, once the monitoring circuit 134 has generated a set of customer alert triggers, each high risk customer association identified via the methods disclosed herein may have a set of associated alert triggers. As such, upon detection of a certain alert trigger, the monitoring circuit 134 may be aware of the particular high risk customer association with which the customer is potentially interacting. Such an awareness may be utilized in the provision of pre-emptive fraud alerts to the customer in accordance with the methods described herein.

Additionally, the monitoring circuit 134 is configured to monitor customer data (e.g., location data, social media data, and transaction data) to identify indications of the occurrence of any customer alert triggers. In this regard, the monitoring circuit 134 is configured to monitor the customer's account at the financial institution for any transactions for a transfer of funds to a high risk customer association or on behalf of a high risk customer association. Additionally, the monitoring circuit 134 may periodically request customer location data from the customer computing device 110 to determine if the customer is within a predetermined distance of a location associated with a high risk customer association. Customer social media data may also be monitored (e.g., the monitoring circuit 134 may include an API configured to receive customer social media information from a social media platform or from a social media application installed on the customer computing device 110) for occurrences of a name or nickname of a high risk customer association (e.g., in customer posts or events). For example, if a social media post between the customer and a high risk customer association contains keywords regarding a transaction (e.g., "buy," "amount," "cash"), but no funds have been transferred from the customer's account to an account of the high risk customer association, the monitoring circuit 134 may determine that the customer has engaged in a transaction on behalf of the high risk customer association.

In various embodiments, once a set of high risk individuals associated with the customer and associated customer alert triggers have been identified, the risk assessment circuit 126 is configured to populate a customer risk profile using such information. Such a profile may be stored in association with the customer's account in the accounts database 138 and used in the generation of pre-emptive fraud alerts that are provided to the customer.

The alert circuit 136 is configured to generate and transmit pre-emptive fraud alerts to the customer computing device 110 upon the monitoring circuit 134 detecting the occurrence of a customer alert trigger. In this regard, upon the monitoring circuit 134 receiving a dataset that corresponds to a customer alert trigger, the alert circuit 136 is configured to identify the high risk customer association associated with the detected customer alert trigger based on the customer risk profile stored in relation to the customer's account in the accounts database 138. Having identified the high risk customer association, the alert circuit 136 may use the identity of the high risk customer association to populate an alert template, and transmit the alert to the customer computing device 110 over the network 170. In some embodiments, the alert is a push notification. As such, the alert may be packaged with a unique identifier associated with customer computing device 110 stored at the financial institution computing system 120 (e.g., the unique identifier may be assigned to the customer computing device 110 upon installation of the financial institution client application 112), and transmitted to a push notification service prior to transmittal to the customer computing device 110. The notification may alert the customer of the potential of encountering a high risk individual.

In some embodiments, the alert is also packaged with commands to a function of the financial institution client application 112 on the customer computing device 110. As such, upon the customer interacting with the notification on the customer computing device 110, the financial institution client application 112 causes a fraud alert interface to be presented to the customer. The fraud alert interface is populated with various information packaged into the alert (e.g., the identified high risk individual, details regarding an attempted transaction between the customer and the high risk individual). Additionally, the fraud alert interface may enable the customer to take action with respect to a transaction with the high risk individual (e.g., cancel the transaction).

In various arrangements, data sources 140-160 include network circuits 142-162 enabling external computing systems (e.g., the financial institution computing system 120) to request and receive information stored in databases 144-164 over the network 170. Databases 144-164 allows the data sources 140-160 to retrievably store information relating to the various operations discussed herein, and may include non-transient data storage mediums (e.g., local disc or flash-based hard drives, local network servers, and the like) or remote data storage facilities (e.g., cloud servers). As will be appreciated, the types and formats of information stored in a particular database of the group of databases 144-164 will vary depending on the nature of the data source 140-160 with which the database is associated. In some arrangements, a particular database may include raw digital information that may be directly transferred to requestors (e.g., the financial institution computing system 120) via an application programming interface (API). Databases 144-164 may also include processed content in the form of web pages and the like. Databases 144-164 may include image files, graphics, and the like. Databases 144-164 may store digital copies of various documents (e.g., government records, and the like). In some arrangements, certain databases 144-164 may be similar to the accounts database 138 discussed above. For example, certain data sources 140-160 may constitute service providers (e.g., social media platforms) where individuals have accounts. As such, an associated database may include describing a user account information (e.g., usernames, purchasing history, account history, and the like) at the service provider. Depending on the nature of the service provided by the service provider, some of this account information may be publicly accessible. For example, the service provider may be a social media provider or a host of a blog and the user may publicly post information under a username. Any sort of information that is in any way retrievable may be stored in databases 144-164.

Figure 3:
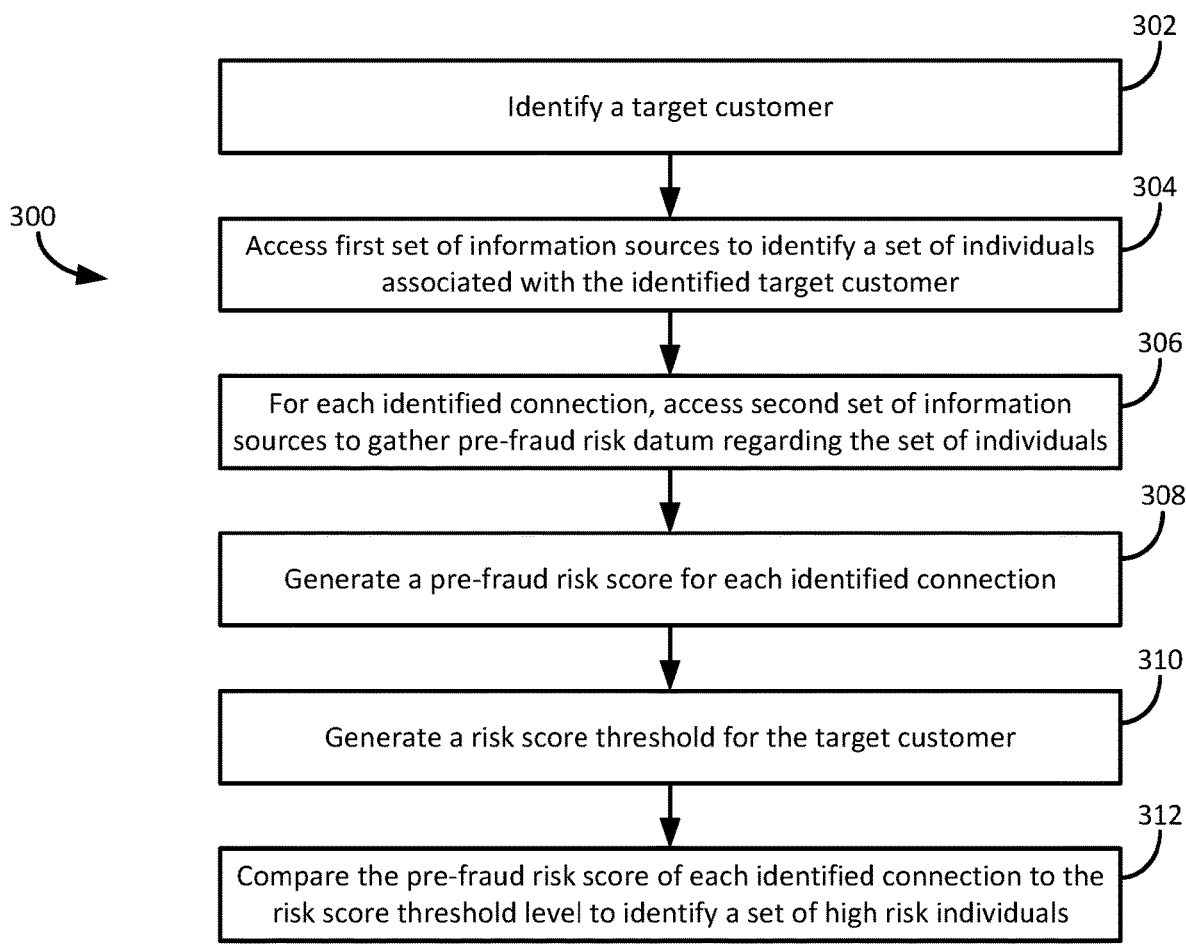
FIG. 3 is a flow diagram of a method of identifying a set of high risk individuals associated with a customer, according to an example embodiment.

Referring now to FIG. 3, a flow diagram of a method 300 of identifying a set of high risk individuals associated with a customer is shown, according to an example embodiment. The method 300 may be performed by components of FIGS. 1-2 such that references may be made to one or more components of FIGS. 1-2 to aid the description of the method 300.

At 302, a target customer is identified. In some embodiments, the risk assessment circuit 126 identifies a target customer based on an input received from the target customer. For example a customer may access the financial institution client application 112 on the customer computing device 110 and indicate a preference to register for a pre-emptive fraud alert program offered by the financial institution (e.g., by selecting such an option on an interface presented to the customer via the financial institution client application 112). In some embodiments, a target customer is selected as a result of the customer reporting a fraudulent transaction to the financial institution.

At 304, the risk assessment circuit 126 (e.g., via the association identifying circuit 128) accesses a set of data sources 140-160 to identify a set of individuals associated with the target customer. As discussed above, the risk assessment circuit 126 may access various social media platforms for information regarding a social media profile of the customer. In this regard, the risk assessment circuit 126 may transmit various information requests to data sources 140-160 associated with various social media platforms. Such information requests may include identifying information (e.g., a name) of the customer. In response, the data sources 140-160 may transmit a series of results back to the financial institution computing system 120. In response, the risk assessment circuit 126 may scrape the returned results for a profile page that applies to the customer (e.g., by searching each of the returned results for multiple aspects of information regarding the customer stored in the accounts database 138). From the social media profile, the risk assessment circuit 126 may identify a list of customer associations (e.g., "friends" of the customer, or other social media users that have interacted with the customer). To identify additional customer associations, the risk assessment circuit 126 may access additional data sources 140-160, such as genealogy websites and other public databases (e.g., government records repositories).

In some embodiments, rather than accessing external data sources 140-160, the risk assessment circuit 126 may be configured to retrieve customer social media and other information from applications on the customer computing device 110. For example, in various embodiments, the financial institution client application 112 includes various APIs proving the financial institution client application 112 access to information on the customer computing device 110 stored in association with additional applications (e.g., social media applications). As such, the risk assessment circuit 126 may retrieve such information from the customer computing device 110, and identify various other individuals that are associated with the customer.

At 306 and 308, the risk assessment circuit 126 (e.g., via the content gathering circuit 130 and association scoring circuit 132) accesses additional data sources to gather pre-fraud risk datum regarding the customer associations and generates pre-fraud risk scores for each of the customer associations. As discussed herein, the pre-fraud risk datum may include a character inferring component and a financial status inferring component. Regarding the financial status inferring component, the risk assessment circuit 126 may access financial data (e.g. stored in the accounts database 138 of the financial institution computing system 120) regarding financial accounts of the customer associations. Regarding the character-inferring components, the risk assessment circuit 126 may access additional data sources 140-160 (e.g., social media platforms, blogs, news websites) to retrieve information regarding various actions performed by the customer associations.

Having gathered the character inferring data and financial status referring data regarding each of the customer associations, the risk assessment circuit 126 may generate a pre-fraud risk score for each of the customer associations. In an example, the risk assessment circuit 126 identifies various risk signatures (e.g., missed payments, account balance trends, withdrawal trends, income trends) based on the customer financial data to generate a financial component of the pre-fraud risk score. Additionally, the risk assessment circuit 126 estimates various attributes of the customer associations based on the actions taken by the customer associations as identified in the content received from the data sources 140-160. Based on the attributes, the risk assessment circuit generates a character component of the pre-fraud risk score. The financial component and the character component are then combined to generate the pre-fraud risk score for each of the customer associations. A more detailed explanation of the computation of the pre-fraud risk score is provided below in relation to FIG. 4.

At 310, the risk assessment circuit 126 generates a risk score threshold for the customer. In some embodiments, the risk score threshold is generated based on an input received from the customer. For example, the risk assessment circuit 126 may transmit a request to the customer computing device 110 causing the customer computing device 110, via the financial institution client application 112, to present the customer with an interface requesting the customer to indicate a risk preference. Customers indicating a high risk preference may receive a higher risk threshold (and thus, receive pre-emptive fraud alerts less often) than those who indicate a lower risk preference.

In some embodiments, the risk threshold generated for the customer may be determined based on information regarding the customer stored in the accounts database 138. For example, customers in good financial health (e.g., receiving a high income, having an account balance above a threshold) may receive higher risk thresholds than customers in poorer financial health. This way, more alerts are provided to customers who stand more to lose (as a percentage) by being defrauded. In an example, the risk assessment circuit 126 accesses a lookup table dependent on the customer's income to identify a risk score threshold to use in association with the customer.

At 312, the risk scores generated at 308 for each of the customer associations is compared to the threshold generated for the customer at 310 to identify a set of high risk customer associations. Customer associations having a pre-fraud risk score higher than the threshold generated for the customer may be identified as high risk individuals. In some embodiments, the financial institution computing system 120 periodically performs the method 300 to update the set of customer associations and to update the pre-fraud risk scores of the customer associations. This way, the customer receives pre-emptive fraud alerts at times that accurately reflect the riskiness of the customer's current circumstances.

Figure 4:
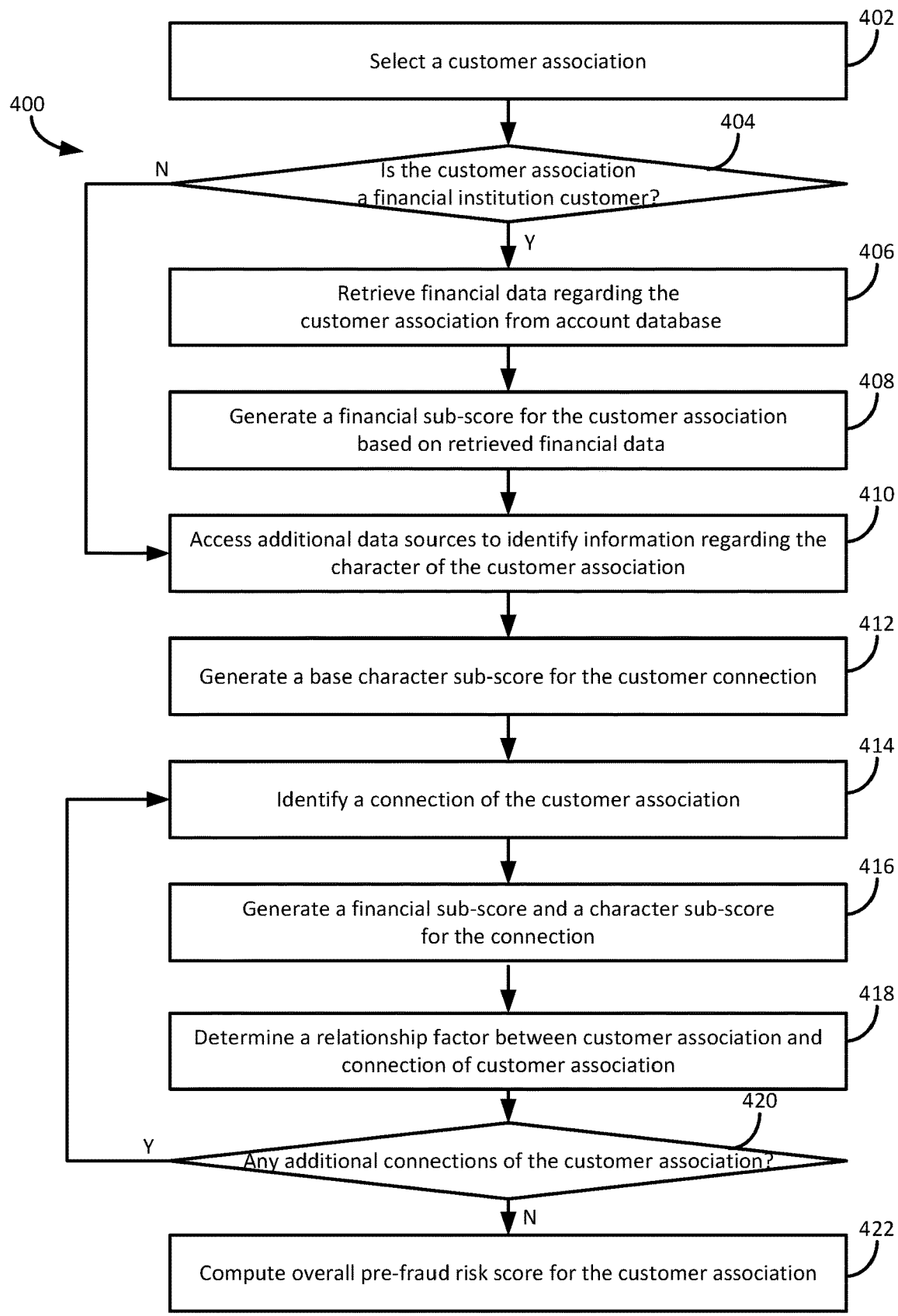
FIG. 4 is a flow diagram of a method of computing a pre-fraud risk score for an individual, according to an example embodiment.

Referring now to FIG. 4, a method 400 is shown for generating a pre-fraud risk score for a customer association, according to an example embodiment. The method 400 may be performed by components of FIGS. 1-2 such that references may be made to one or more components of FIGS. 1-2 to aid the description of the method 400. In various embodiments, the method 400 is repeated for each customer association identified by the association identifying circuit 128 (e.g., at step 304 of the method 300 discussed above).

At 402, a customer association is selected. For example, the risk assessment circuit 126 (e.g., via the association scoring circuit 132) may select a customer association identified by the association identifying circuit 128. At 404, the risk assessment circuit 126 determines if the selected customer association is a customer of the financial institution. For example, the risk assessment circuit 126 may cross reference a name of the customer association with a the names of various financial institution customers stored in the accounts database 138. If a match is found, the customer association has an account at the financial institution. In some embodiments, accounts listed under names matching the customer association may be verified (e.g., to determine if they are actually possessed by the customer association). In this regard, the risk assessment circuit 126 may retrieve information regarding the customer association gained via accessing one of the data sources 140-160 via the steps described herein (e.g., a customer address or phone number learned via a social media profile), and cross reference the retrieved information with information stored in relation to the matching account. If the information matches, the account is verified as belonging to the customer association.

At 406, if the risk assessment circuit 126 determines that the customer association possesses an account at the financial institution, or if the customer association is otherwise associated with the financial institution, financial data regarding the customer connection is retrieved from the accounts database 138. Such information may comprise the financial status component of the pre-fraud risk datum used to generate the pre-fraud risk score for the customer association. The information regarding the customer association that is retrieved from the accounts database 138 varies depending on the nature of the relationship between the customer association and the financial institution. For example, if the customer association has a checking account, savings account, and credit account at the financial institution, the retrieval of financial data may include information regarding a plurality of transactions of the customer association, account balance information, payment information, and investment information. However, if the customer association has a more limited relationship with the financial institution, the data regarding the customer association stored at the accounts database 138 may be more limited.

In some embodiments, in addition to retrieving information regarding the customer association from the accounts database 138, the risk assessment circuit 126 also accesses external data sources 140-160 to retrieve information regarding finances of the customer association. For example, in some situations, if the customer association applied for an account at the financial institution, the financial institution may have access to a credit report at a credit bureau. Accordingly, the risk assessment circuit 126 may request such a credit report that contains information regarding customer finances (e.g., a customer credit history, employment history, and the like). Additionally, the risk assessment circuit 126 may also be configured to access an additional database (e.g., a foreclosure database) to locate additional information relevant to the customer association's finances. In various embodiments, the risk assessment circuit 126 performs such steps even if it is determined that the customer association does not possess an account at the financial institution.

At 408, the risk assessment circuit 126 (e.g., via the association scoring circuit 132) generates a financial sub-score component of the pre-fraud risk score based on the financial data regarding the customer association. In some embodiments, the generated financial sub-score may range from zero to a positive value, with zero indicating that the customer association is a low risk individual (e.g., in strong financial health), and the positive value indicating a high risk that the customer association may engage in a fraudulent transaction. To determine the magnitude of the financial sub-score, the risk assessment circuit 126 may identify various risk signatures in the financial data regarding the customer association. Such risk signatures may include various transactions or trends, and may each include an associated subcomponent score used to generate the financial sub-score. For example, various negative account balance trends (e.g., by various amounts over predetermined periods) may each have an associated subcomponent score. Large declines in account balances over shorter periods may have higher associated subcomponent scores than lower declines. Accordingly, the risk assessment circuit 126 may identify trends in the customer association's account balance information and, if an identified trend matches parameters of a trend associated with a financial subcomponent score, the risk assessment circuit 126 may associate the subcomponent score with the customer association.

The risk assessment circuit 126 may perform similar operations with respect to various other aspects of the customer association's financials. For example, within a transaction history of the customer association, the risk assessment circuit 126 may identify missed payments (e.g., rent, bills) of the customer association, and associate another subcomponent score with the customer association that is based on the magnitude of the missed payment or the type of missed payment. In another example, a decline in income of the association (e.g., as determined by a reduction in a periodic deposit into the association's account) also leads to a subcomponent score being applied to the association.

Having identified various risk signatures within the financial data regarding the customer association, and thus associating various financial subcomponent scores to the customer association, the risk assessment circuit 126 aggregates the subcomponent scores to arrive at a financial sub-score for the customer association. In the example disclosed herein, since the customer association only accumulates a positive subcomponent score in the event that a risk signature is identified within the association's financial data, the financial sub-score ranges from zero (e.g., in the event that no risk signatures are identified) to a positive value (e.g., the summation of the subcomponent scores associated with any identified risk signatures). It should be understood that alternative scoring metrics are envisioned. In an example, an association may receive a positive financial sub-score if the association has various indicators of strong financial health, or a negative sub-score if risk signatures outweigh the indicators of strong financial health.

At 410, after generating a financial sub-score for the customer association, or if no financial data regarding the customer association is available, the risk assessment circuit 126 (e.g., via the content gathering circuit 130) accesses various data sources 140-160 to identify information regarding the character of the customer association. In this regard, risk assessment circuit 126 may formulate information requests to various types of data sources 140-160 using the identity of the customer association. The risk assessment circuit 126 may request information from social media platforms (e.g., social media profile pages of the association) using the customer association's identity. In response, the financial institution computing system 120 may receive information regarding the interactions of the association with various other users of the social media platform (e.g., posts by or directed at the association on social media), information regarding connections of the customer association (e.g., "friends" of the customer association), and other general information regarding the customer association (e.g., biographical information such as family information, an address, occupation). Similar information requests may be sent to various other types of data sources 140-160 (e.g., search engines, news feeds, blogs). Upon receiving results from the data sources, the risk assessment circuit 126 utilizes web scraping and harvesting algorithms to parse the content and identify information pertaining to the customer association.

In some embodiments, from this information, the risk assessment circuit 126 makes inferences regarding the character of the customer association. For example, if the risk assessment circuit 126 receives information regarding various social media posts regarding the customer association that describe the customer association as having a particular character trait (e.g., a user posts that the association is an honest person, or engaged in the community), the risk assessment circuit 126 may attribute that trait to the customer association. The risk assessment circuit 126 may also infer character traits based on actions identified as being performed by the customer association. For example, based on various events attended by the customer association (e.g., charitable events), the risk assessment circuit 126 may infer that the customer association is involved in the customer association's community. In another example, if social media posts regarding the customer association attribute a negative trait to the customer (e.g., indicate that the customer attends an event where a negative incident took place), the risk assessment circuit 126 may infer a negative character trait (e.g., recklessness) to the customer association. In various embodiments, each inferred character trait has either a positive character subcomponent score or a negative character subcomponent score associated therewith. Accordingly, the risk assessment circuit 126 may assign various character subcomponent scores based on the inferred character traits.

Additionally, the risk assessment circuit 126 may determine if any records regarding the customer association exist in various other data sources 140-160. For example, the risk assessment circuit 126 may search electronic criminal records databases (e.g., associated with various government entities such as municipal, county, state, and federal governments) using the identity of the customer association. If any records are returned by the database, the risk assessment circuit 126 may verify that a returned record pertains to the customer association by cross referencing information retrieved from other data sources 140-160 (e.g., a social media profile) with information contained in the record. If the record is verified, the risk assessment circuit 126 identifies the crime (or other recorded violation) committed by the customer association. In various embodiments, the risk assessment circuit 126 assigns a negative character subcomponent score based on the identified crime or violation.

At 412, a base character sub-score for the customer connection is generated. In various embodiments, the risk assessment circuit 126 sums the various character component subcomponent scores identified at 410 to generate the base character sub-score. As such, the customer association may have a positive base character sub-score or a negative base character sub-score depending on the identity of the character traits attributed to the customer association.

At 414, a connection of the customer association is identified. In various embodiments, the base character sub-score of the customer association is adjusted based on the information that is obtained regarding connections of the customer association. Accordingly, the risk assessment circuit 126 may substantially re-perform the step 304 discussed with respect to FIG. 3 except that, instead of searching for individuals associated with the customer, the risk assessment circuit 126 is searching for individuals associated with the customer association. After identifying the connections of the customer association, one such connection is selected by the risk assessment circuit 126, and the method 400 continues.

At 416, a financial sub-score and a character sub-score are generated the selected connection of the customer association. In this regard, the risk assessment circuit 126 re-performs steps 404-412 to gather pre-fraud risk datum regarding the connection of the customer association and generate a character sub-score with respect the selected connection.

At 418, the risk assessment circuit 126 determines a relationship factor between the customer association and the selected connection of the customer association. In some embodiments, the risk assessment circuit 126 makes such a determination based on social media data regarding the customer association. For example, within data received from a social media platform, the risk assessment circuit 126 may identify the quantity and frequency of interactions between the two individuals, and generate a relationship factor as a function of these two metrics. The relationship factor may be utilized in the computation of the overall pre-fraud risk score of the customer association.

At 420, it is determined if there are any additional connections of the customer association. If the steps 416 and 418 have been performed for each individual identified to have a connection with the customer association, then the method proceeds to 422. If not, another connection of the customer association is selected and steps 416 and 418 are repeated until all of the identified connections have been scored. As a result, upon completion of steps 416 and 418 with respect to each of the connections identified to have a relationship with the customer association, the risk assessment circuit 126 may generate a number of different character sub-scores and relationship factors for each of the connections of the customer association.

At 422, an overall pre-fraud risk score is computed for the customer association. In various embodiments, the risk assessment circuit 126 first computes an adjustment factor for the customer association's base character sub-score based on the scores of the connections of the customer association generated via the iterations of steps 414-420. In this regard, the risk assessment circuit 126 computes the adjustment factor via a weighted summation of each character sub-scores of each of the connections of the customer association. In some embodiments, the weights correspond to the relationship factors generated at 418. This way, the character sub-scores of the connections bearing the closest relationship to the customer association receive the most weight in the determination of the customer association's character sub-score.

As such, the adjustment factor is dependent on the character sub-scores of the connections of the customer association. The adjustment factor may be positive if the character sub-scores of the connections of the customer association are determined to be positive, or negative if the character sub-scores of the connections of the customer association are determined to be negative.

Upon computation of the adjustment factor, the risk assessment circuit 126 adjusts the customer association's base character sub-score using the adjustment factor. In an embodiment, the adjustment factor is added to the base character sub-score. After this, to compute the overall pre-fraud risk sub-score, the risk assessment circuit 126 combines the financial sub-score with the adjusted character sub-score using a predetermined set of weights. In some embodiments, if the character sub-score of the customer association is negative, the magnitude of the character sub-score is positively added to the financial sub-score to produce the overall pre-fraud risk sub-score. If the character sub-score of the customer association is positive, the magnitude of the character sub-score is inverted (to reduce the magnitude of the financial sub-score to reflect the positive character traits of the customer association) and added to the financial sub-score to produce the overall pre-fraud risk sub-score.

Figure 5:
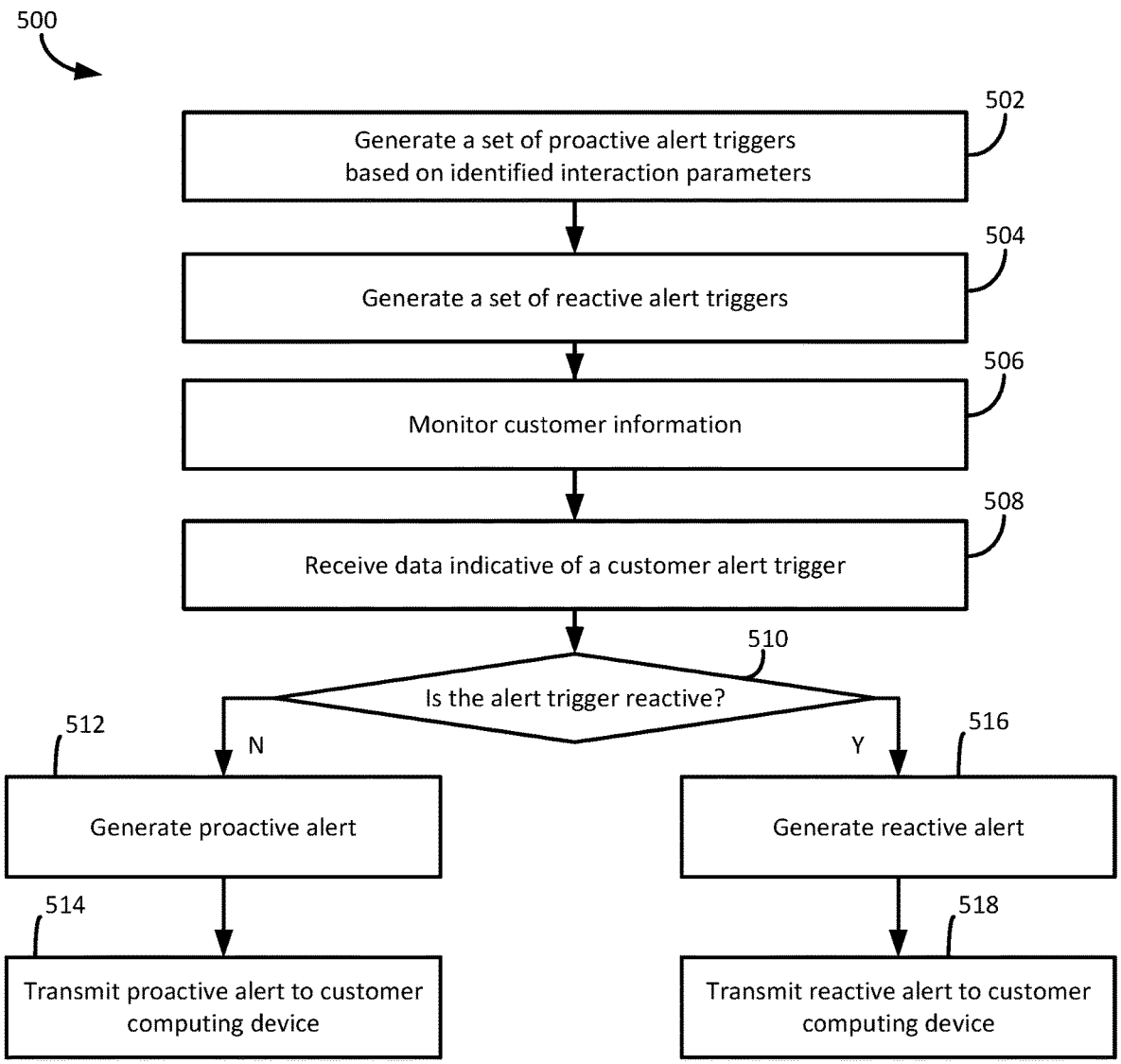
FIG. 5 is a flow diagram of a method of providing pre-emptive fraud alerts to a customer, according to an example embodiment.

Referring now to FIG. 5, a method 500 for providing timely alerts to a customer is shown, according to an example embodiment. The method 500 may be performed by components of FIGS. 1-2 such that references may be made to one or more components of FIGS. 1-2 to aid the description of the method 500.

At 502, the risk assessment circuit 126 (e.g., via the monitoring circuit 134) generates a set of proactive alert triggers (e.g., alert triggers configured to alert the customer prior to engaging in a transaction with a high risk customer association) for the customer. In this regard, the risk assessment circuit 126 identifies a set of parameters defining potential interactions between the customer and the high risk customer associations (e.g., identified by a combination of the methods 300 and 400 discussed with respect to FIGS. 3-4). In some embodiments, the risk assessment circuit 126, identifies a set of locations associated with the high risk customer associations based on data collected regarding the customer associations (e.g., during the method 400 discussed in relation to FIG. 4). For example, in some embodiments, based on social media or other public information, the risk assessment circuit 126 identifies where the customer associations live and work (e.g., via social media profiles), and sets location coordinates associated with those places as customer alert triggers. This way, upon receiving location data from the customer computing device 110 that indicates that the customer is approaching such a location, an alert is transmitted to the customer device warning the customer of the risky status of the customer association.

In some embodiments, the risk assessment circuit 126 also determines if the financial institution computing system 120 has access to location data of the high risk customer associations. For example, a customer association may be a customer of the financial institution and have an application (e.g., similar to the financial institution client application 112) installed on an associated device that provides location information to the financial institution computing system 120. In such a case, the risk assessment circuit 126 may tie the location information of the customer association with that of the customer and define a threshold as a customer alert trigger. As such, upon the customer being within a predetermined distance of the high risk customer association, an alert is transmitted to the customer.

In some embodiments, the risk assessment circuit 126 sets various other additional datasets as customer alert triggers. In an example, the risk assessment circuit 126 monitors customer social media information, and sets the identity of the customer association as a customer alert trigger. As such, if the customer social media data reveals that the customer is going to an event with the customer association, the customer is provided an alert. In some embodiments, if any customer interaction with the high risk customer association is detected, the customer is provided with an alert. As a result of the processes performed at 502, the risk assessment circuit 126 may generate a number of different proactive alert triggers for each high risk customer association.

At 504, the risk assessment circuit 126 (e.g., via the monitoring circuit 134) generates a set of reactive alert triggers (e.g., alert triggers configured to alert the customer of the high risk status of the individual after a transaction has been initiated) for the customer. In this regard, in some embodiments, the risk assessment circuit 126 defines a set of parameters for various channels through which the customer may attempt to transact with a high risk customer association. For example, if some high risk customer associations are also customers of the financial institution, the risk assessment circuit 126 may identify account numbers associated with the high risk customer associations, and use such account numbers to generate a set of alert triggers. The account numbers may be paired with the customer's account in the accounts database 138 such that, if a customer request to transfer funds to one of the identified accounts is received, the customer will be provided with an alert prior to the transaction ultimately being approved.

In some embodiments, the identities of the high risk customer associations are also used as reactive alert triggers. For example, the customer may seek to engage in a transaction with a high risk customer association via a person-to-person ("P2P") payments application (e.g., offered by the financial institution as part of the financial institution client application 112). To make a payment, the customer may enter the name of a high risk customer association into an interface presented to the customer (e.g., via the financial institution client application 112) on the customer computing device 110, causing a transaction request to be transmitted to the financial institution computing system 120. Thus, if the name of the high risk customer association to which the customer seeks to make a payment is established as a customer alert trigger, the customer will be provided with an alert prior to the transaction ultimately being approved. As a result of the processes performed at 504, the risk assessment circuit 126 may generate a number of different reactive alert triggers for each high risk customer association.

At 506, the risk assessment circuit 126 (e.g., via the monitoring circuit 134) monitors customer information. In various embodiments, via registering for the pre-emptive alert program offered by the financial institution, the customer provides the financial institution computing system 120 with access to various forms of customer information such as customer location information, customer social media information, and other additional forms of customer information (e.g., customer photographs, customer search engine data). As such, in various embodiments, the customer computing device 110 provides such data to financial institution computing system 120 upon receiving a request from the financial institution computing system 120. Thus, the risk assessment circuit 126 periodically (e.g., every five minutes, hourly, daily) requests information from the customer computing device 110. Alternatively or additionally, the risk assessment circuit 126 may periodically request customer information from various external computing systems (e.g., social media platforms). As a result, the risk assessment circuit 126 is aware of aspects of the customer's circumstances (e.g., location, recent communications with other social media users).

At 508, the risk assessment circuit 126 (e.g., via the monitoring circuit 134) receives data indicative of a customer alert trigger. In various embodiments, each time the risk assessment circuit 126 receives customer information, customer alert triggers established at 502 and 504 are retrieved and compared with the received information. If the received customer information includes a dataset (e.g., set of location data, a portion of a social media post, an account number in a transaction request) that matches a customer alert trigger, the method 500 advances.

At 510, the risk assessment circuit 126 (e.g., via the monitoring circuit 134) determines whether the detected alert trigger is proactive or reactive. In various embodiments, the alert that is provided to the customer varies depending on the type of alert trigger that is detected. Accordingly, the determination at 510 ultimately depends on the type of data received at 508. If the data is associated with a proactive alert trigger (e.g., location information, social media information, phone call information, e-mail information), the method advances to 512.

At 512, the risk assessment circuit 126 (e.g., via the alert circuit 136) generates a proactive alert. In various embodiments the risk assessment circuit 126 populates a proactive alert template using the identity of the high risk customer association related to the detected alert trigger. The template is packaged with a unique identifier associated with the customer computing device 110.

At 514, the proactive alert is transmitted to the customer computing device 110 over the network 170. In some embodiments, the proactive alert trigger is a push notification, and is configured to provide an input to the financial institution client application 112 upon receipt at the customer computing device 110. Upon the customer interacting with the notification, the financial institution client application 112 may cause the customer computing device 110 to present the customer with an alert interface. The alert interface may identify the high risk individual and generally inform the customer of the high risk status of the customer association.

At 516, if the data received at 508 is associated with a reactive alert trigger, the risk assessment circuit 126 (e.g., via the alert circuit 136) generates a reactive alert for the customer. In some situations, reactive alert triggers are associated with a transaction request received by the financial institution computing system 120 (e.g., resulting from when a customer association seeks to cash a check written by the customer, or when the customer seeks to engage in a transaction via a P2P payment application). The reactive alert trigger may contain details regarding the proposed transaction between the customer and a high risk customer association. Accordingly, if the data received at 508 contains details regarding the prospective transaction such as a counterparty to the customer (e.g. the high risk customer association), a timing, and an amount, the risk assessment circuit 126 may package the details regarding the transaction into a reactive alert template.

At 518 the reactive alert is transmitted to the customer computing device 110 over the network 170. In some embodiments, the reactive alert is a push notification, and is configured to provide an input to the financial institution client application 112 upon receipt at the customer computing device 110. Upon the customer interacting with the notification, the financial institution client application 112 may cause the customer computing device 110 to present the customer with an alert interface. The alert interface may identify the high risk individual, and also prompt the customer to approve the transaction. In some embodiments, the financial institution computing system 120 does not approve a transaction request involving the customer and a high risk customer association unless the customer approves the transaction via the alert. This way, the customer only engages in transactions with high risk customer associations only after the customer is made aware of the high risk status of the customer association.

The embodiments described herein have been described with reference to drawings. The drawings illustrate certain details of specific embodiments that implement the systems, methods, and programs described herein. However, describing the embodiments with drawings should not be construed as imposing on the disclosure any limitations that may be present in the drawings.

It should be understood that no claim element herein is to be construed under the provisions of 35 U.S.C. § 112(f), unless the element is expressly recited using the phrase "means for."

As used herein, the term "circuit" may include hardware structured to execute the functions described herein. In some embodiments, each respective "circuit" may include machine-readable media for configuring the hardware to execute the functions described herein. The circuit may be embodied as one or more circuitry components including, but not limited to, processing circuitry, network interfaces, peripheral devices, input devices, output devices, sensors, etc. In some embodiments, a circuit may take the form of one or more analog circuits, electronic circuits (e.g., integrated circuits (IC), discrete circuits, system on a chip (SOCs) circuits), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR), resistors, multiplexers, registers, capacitors, inductors, diodes, wiring, and so on).

The "circuit" may also include one or more processors communicatively coupled to one or more memory or memory devices. In this regard, the one or more processors may execute instructions stored in the memory or may execute instructions otherwise accessible to the one or more processors. In some embodiments, the one or more processors may be embodied in various ways. The one or more processors may be constructed in a manner sufficient to perform at least the operations described herein. In some embodiments, the one or more processors may be shared by multiple circuits (e.g., circuit A and circuit B may comprise or otherwise share the same processor which, in some example embodiments, may execute instructions stored, or otherwise accessed, via different areas of memory). Alternatively or additionally, the one or more processors may be structured to perform or otherwise execute certain operations independent of one or more co-processors. In other example embodiments, two or more processors may be coupled via a bus to enable independent, parallel, pipelined, or multi-threaded instruction execution. Each processor may be implemented as one or more general-purpose processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor), microprocessor, etc. In some embodiments, the one or more processors may be external to the apparatus, for example the one or more processors may be a remote processor (e.g., a cloud based processor). Alternatively or additionally, the one or more processors may be internal and/or local to the apparatus. In this regard, a given circuit or components thereof may be disposed locally (e.g., as part of a local server, a local computing system) or remotely (e.g., as part of a remote server such as a cloud based server). To that end, a "circuit" as described herein may include components that are distributed across one or more locations.

An exemplary system for implementing the overall system or portions of the embodiments might include general purpose computing devices in the form of computers, including a processing unit, a system memory, and a system bus that couples various system components including the system memory to the processing unit. Each memory device may include non-transient volatile storage media, non-volatile storage media, non-transitory storage media (e.g., one or more volatile and/or non-volatile memories), etc. In some embodiments, the non-volatile media may take the form of ROM, flash memory (e.g., flash memory such as NAND, 3D NAND, NOR, 3D NOR), EEPROM, MRAM, magnetic storage, hard discs, optical discs, etc. In other embodiments, the volatile storage media may take the form of RAM, TRAM, ZRAM, etc. Combinations of the above are also included within the scope of machine-readable media. In this regard, machine-executable instructions comprise, for example, instructions and data which cause a general purpose computer, special purpose computer, or special purpose processing machines to perform a certain function or group of functions. Each respective memory device may be operable to maintain or otherwise store information relating to the operations performed by one or more associated circuits, including processor instructions and related data (e.g., database components, object code components, script components), in accordance with the example embodiments described herein.

It should also be noted that the term "input device," as described herein, may include any type of input device or input devices including, but not limited to, a keyboard, a keypad, a mouse, joystick, or other input devices capable of performing a similar function. Comparatively, the term "output device," as described herein, may include any type of output device or output devices including, but not limited to, a computer monitor, printer, facsimile machine, or other output devices capable of performing a similar function.

Any foregoing references to currency or funds are intended to include fiat currencies, non-fiat currencies (e.g., precious metals), and math-based currencies (often referred to as cryptocurrencies). Examples of math-based currencies include Bitcoin, Litecoin, Dogecoin, and the like.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure. Likewise, software and web implementations of the present disclosure could be accomplished with standard programming techniques with rule based logic and other logic to accomplish the various database searching steps, correlation steps, comparison steps, and decision steps.

The foregoing description of embodiments has been presented for purposes of illustration and description. It is not intended to be exhaustive or to limit the disclosure to the precise form disclosed, and modifications and variations are possible in light of the above teachings or may be acquired from this disclosure. The embodiments were chosen and described to explain the principals of the disclosure and its practical application to enable one skilled in the art to utilize the various embodiments and with various modifications as are suited to the particular use contemplated. Other substitutions, modifications, changes, and omissions may be made in the design, operating conditions, and arrangement of the embodiments without departing from the scope of the present disclosure as expressed in the appended claims.

What is claimed is:

1. A financial institution computing system associated with a financial institution, comprising:
   a network interface configured to exchange data over a network;
   an accounts database storing information pertaining to various accounts of a plurality of customers of the financial institution including an account of a target customer;
   a monitoring circuit configured to set alert triggers, monitor alert trigger information, and monitor a location of the target customer by periodically requesting customer location data from a customer computing device associated with the target customer, wherein alert triggers are set based on individuals identified by a risk assessment processing circuit; and
   the risk assessment processing circuit configured to:
      identify an individual having a prior interaction with the target customer;
      generate a character sub-score of the individual based on accessing a data source external to the financial institution computing system to identify a set of actions performed by a set of social media connections of the individual;
      generate a financial sub-score of the individual based on accessing the account database to identify financial information of the individual;
      generate a risk score for the individual based on a weighted combination of the financial sub-score and the character sub-score;
      determine alert trigger information of the individual, wherein the alert trigger information comprises an account number of the individual;
      send, to the monitoring circuit, the alert trigger information of the individual for monitoring by the monitoring circuit;
      determine a financial health of the target customer based on an account balance of the target customer;
      generate a risk score threshold of the target customer based on a risk preference previously indicated by the target customer and the financial health of the target customer;
      determine that the risk score for the individual exceeds the risk score threshold;
      receive, from the monitoring circuit, an indication of a potential interaction between the target customer and the identified individual, the potential interaction determined based on the monitored location of the target customer, the alert trigger, and determining that the target customer has been within a set of locations associated with the identified individual; and
      transmit, by the network interface, an alert to the customer computing device associated with the target customer in response to receiving the indication, the risk score exceeding the risk score threshold, and prior to the target customer completing a transaction with the identified individual, the alert notifying the target customer that the individual has a high likelihood of defrauding the target customer.

2. The financial institution computing system of claim 1, wherein generating the risk score includes at least one of determining that the individual is in financial stress based on the information regarding the individual and determining that the target customer previously transferred funds to the individual.

3. The financial institution computing system of claim 1, wherein determining that the individual is in financial stress is based on an identification of at least one of a loss of a job of the individual, a financial obligation being incurred by the individual, or a failure of the individual to make a scheduled payment.

4. The financial institution computing system of claim 1, wherein the prior interaction between the individual and the target customer is an in person interaction, the in person interaction determined using the location of the target customer and location of the individual.

5. The financial institution computing system of claim 1, wherein the risk assessment processing circuit is further configured to access information regarding the target customer stored at an external computing system associated with a social media platform, wherein the accessed information includes information regarding a set of social media connections of the target customer, wherein the set of social media connections is a list of people and wherein the individual is included in the set of social media connections of the target customer.

6. The financial institution computing system of claim 1, wherein the risk assessment processing circuit is further configured to:
   determine that the individual has an account at the financial institution; and
   retrieve information regarding the account of the individual from the accounts database, the retrieved information including a transaction history of the individual, wherein the risk score is further generated based on the retrieved information.

7. The financial institution computing system of claim 1, wherein the risk assessment processing circuit is further configured to generate the risk score threshold based on information regarding the target customer stored in the accounts database.

8. The financial institution computing system of claim 1, wherein the risk assessment processing circuit is further configured to:
   associate an action of the set of actions with a positive character score or a negative character score.

9. The financial institution computing system of claim 8, wherein generating the financial sub-score is further based on identifying at least one signature of financial distress based on information pertaining to an account of the identified individual stored in the accounts database.

10. The financial institution computing system of claim 9, wherein generating the character sub-score of the risk score further includes:
   accessing information regarding the identified individual stored at an external computing system associated with a social media platform, wherein the accessed information includes information regarding the set of social media connections of the identified individual, and wherein the set of social media connections is a list of people and wherein the individual is included in the set of social media connections of the target customer;
   accessing the data source external to the financial institution computing system to identify a set of actions performed by the set of social media connections of the identified individual; and
   associating each action in the set of actions with a positive character score or a negative character score.

11. The financial institution computing system of claim 1, wherein the indication of the potential interaction between the target customer and the identified individual includes the location data received from the customer computing device.

12. A computer-implemented method, comprising:
   identifying, by a financial institution computing system associated with a financial institution, an individual having a prior interaction with a target customer;
   generating, by the financial institution computing system, a character sub-score of the individual based on accessing a data source external to the financial institution computing system to identify a set of actions performed by a set of social media connections of the individual;
   generating, by the financial institution computing system, a financial sub-score of the individual based on accessing an account database to identify financial information of the individual;
   generating, by the financial institution computing system, a risk score for the individual based on a weighted combination of the financial sub-score and the character sub-score;
   determining, by the financial institution computing system, alert trigger information of the individual, wherein the alert trigger information comprises an account number of the individual;
   determining, by the financial institution computing system, a financial health of the target customer based on an account balance of the target customer;
   generating, by the financial institution computing system, a risk score threshold of the target customer based on a risk preference previously indicated by the target customer and the financial health of the target customer;
   determining, by the financial institution computing system, that the risk score for the individual exceeds the risk score threshold;
   monitoring, by the financial institution computing system, a location of the target customer by periodically requesting customer location data from a customer computing device;
   receiving, by the financial institution computing system, an indication of a potential interaction between the target customer and the identified individual, the potential interaction determined based on the monitored location of the target customer, the alert trigger, and determining that the target customer has been within a set of locations associated with the identified individual; and
   transmitting, by the financial institution computing system, an alert to the customer computing device associated with the target customer in response to receiving the indication, the risk score exceeding the risk score threshold, and prior to the target customer completing a transaction with the identified individual, the alert notifying the target customer that the identified individual has a high likelihood of defrauding the customer.

13. The method of claim 12, wherein the prior interaction between the individual and the target customer is a social media interaction on a social media platform, wherein the method further comprises accessing, by the financial institution computing system, information regarding the target customer stored at an external computing system associated with the social media platform, wherein the accessed information includes information regarding a set of social media connections of the target customer, wherein the set of social media connections is a list of people and wherein the individual is included in the set of social media connections of the target customer.

14. The method of claim 12, further comprising:
   determining, by the financial institution computing system, that the identified individual has an account at the financial institution; and
   retrieving, by the financial institution computing system, information regarding the account of the individual from an accounts database associated with the financial institution computing system, the retrieved information including a transaction history of the individual, wherein the risk score is further generated based on the retrieved information.

15. The method of claim 12, wherein the method further comprises:
   associating, by the financial institution computing system, the action with a positive character score or a negative character score.

16. The method of claim 15, wherein generating the financial sub-score is further based on identifying at least one signature of financial distress based on information pertaining to an account of the identified individual stored in the accounts database.

17. The method of claim 15, wherein generating the character sub-score of the risk score further includes:
   accessing, by the financial institution computing system, information regarding the identified individual stored at an external computing system associated with a social media platform, wherein the accessed information includes information regarding the set of social media connections of the identified individual, and wherein the set of social media connections is a list of people and wherein the individual is included in the set of social media connections of the target customer;
   accessing, by the financial institution computing system, the data source external to the financial institution computing system to identify a set of actions performed by the set of social media connections of the identified individual; and
   associating, by the financial institution computing system, each action in the set of actions with a positive character score or a negative character score.

18. A non-transitory computer readable media having computer-executable instructions embodied therein that, when executed by a risk assessment processing circuit of a computing system, causes the computing system to perform operations, the operations comprising:

identifying an individual having a prior interaction with a target customer;

generating a character sub-score of the individual based on accessing a data source external to the financial institution computing system to identify a set of actions performed by a set of social media connections of the individual;

generating a financial sub-score of the individual based on accessing an account database to identify financial information of the individual;

generating a risk score for the identified individual based on a weighted combination of the financial sub-score and the character sub-score;

determining alert trigger information of the individual, wherein the alert trigger information comprises an account number of the individual;

determining a financial health of the target customer based on an account balance of the target customer;

generating a risk score threshold of the target customer based on a risk preference previously indicated by the target customer and the financial health of the target customer;

determining that the risk score for the individual exceeds the risk score threshold;

monitoring a location of the target customer by periodically requesting customer location data from a customer computing device;

receiving an indication of a potential interaction between the target customer and the identified individual, the potential interaction determined based on the monitored location of the target customer, the alert trigger, and determining that the target customer has been within a set of locations associated with the identified individual; and transmitting an alert to the customer computing device associated with the target customer in response to receiving the indication, the risk score exceeding the risk score threshold, and prior to the target customer completing a transaction with the identified individual, the alert notifying the target customer of a likelihood that the identified individual will defraud the target customer.

\* \* \* \* \*